Aug. 7, 1945.    T. F. RAINSFORD    2,381,773
GEAR SHIFTING MECHANISM
Filed June 7, 1944    5 Sheets-Sheet 1
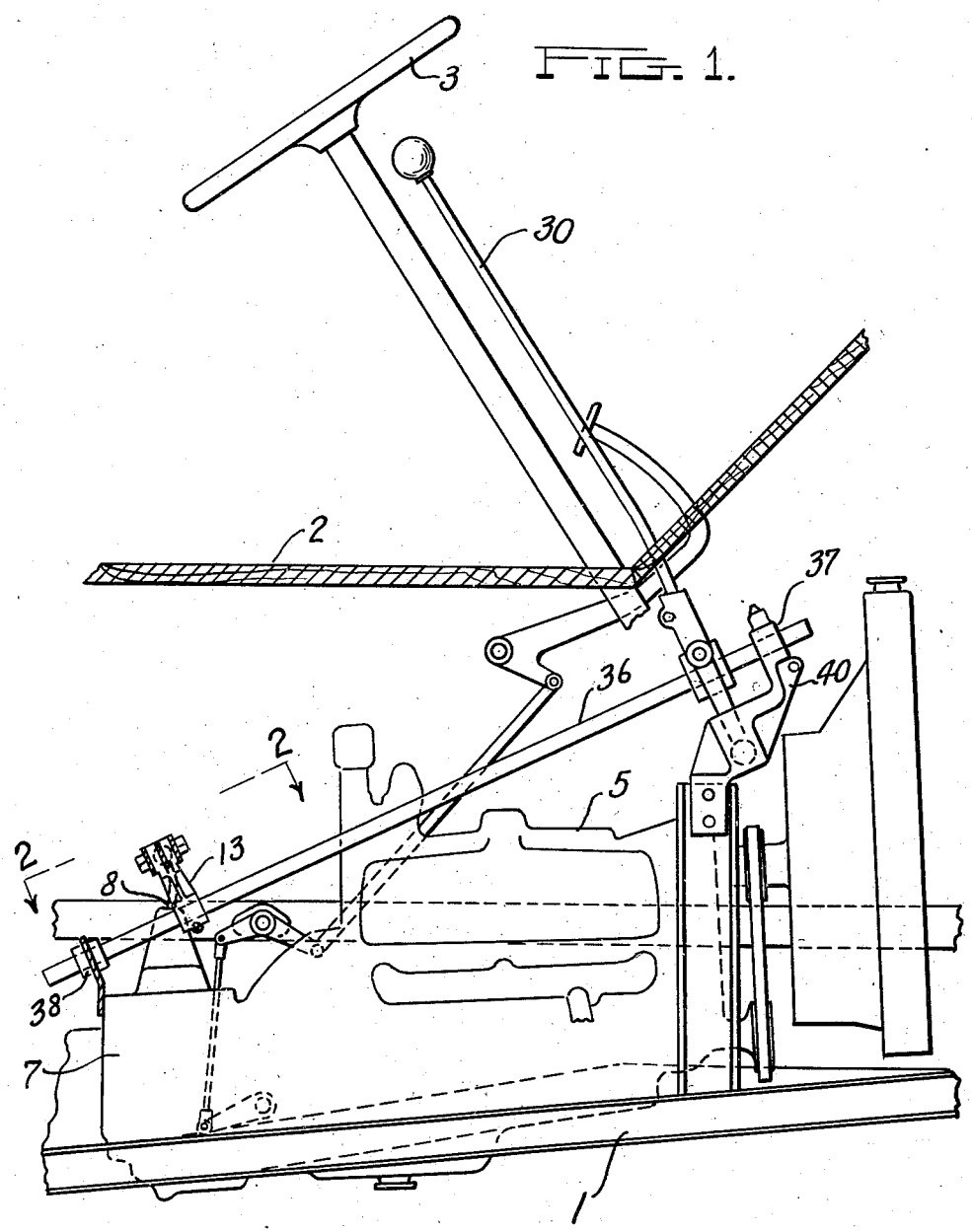
INVENTOR.
Thomas F. Rainsford
BY
Barnes, Kisselle, Laughlin & Raisch
Attorneys

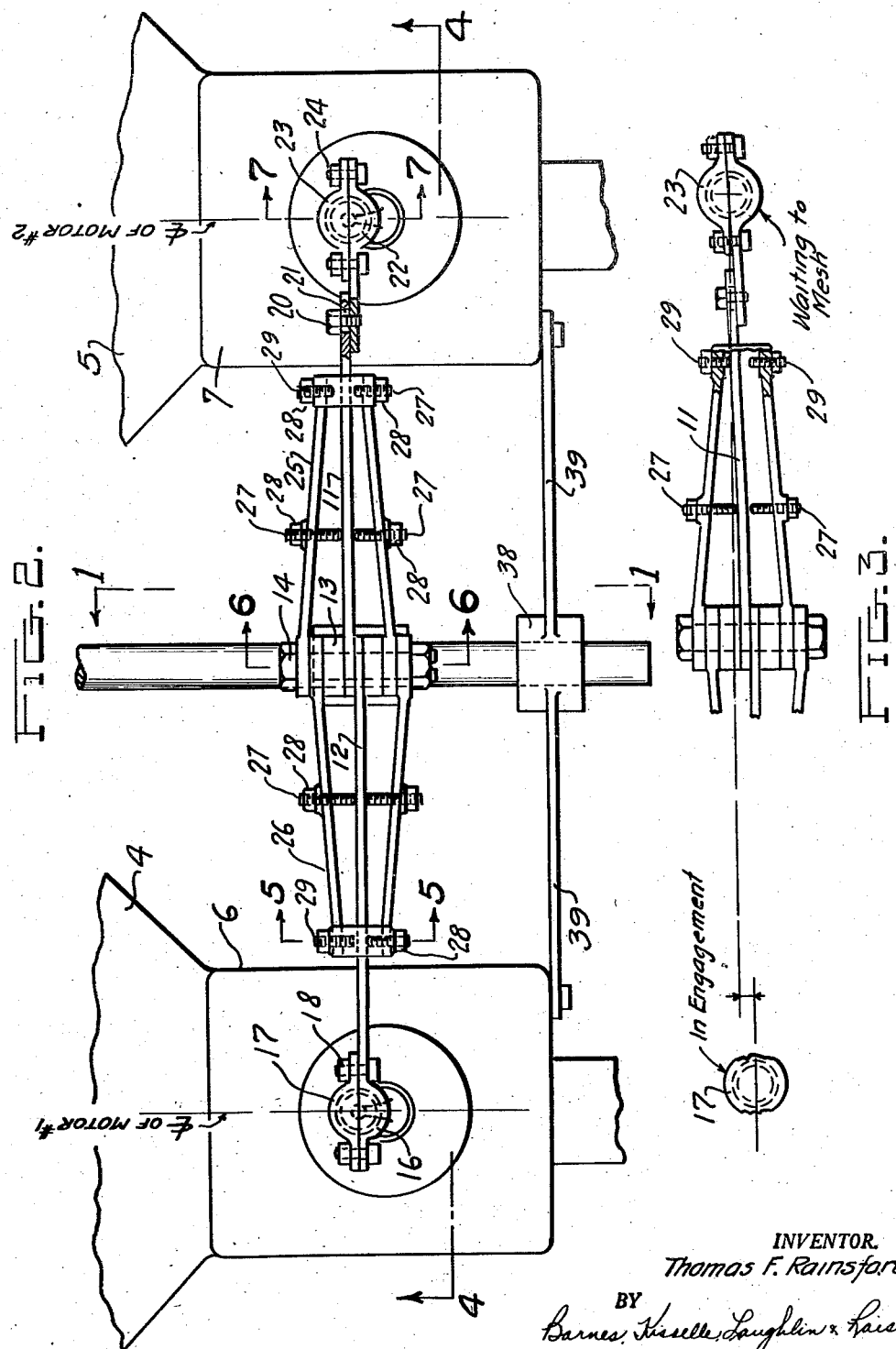

Aug. 7, 1945.  T. F. RAINSFORD  2,381,773
GEAR SHIFTING MECHANISM
Filed June 7, 1944   5 Sheets-Sheet 3
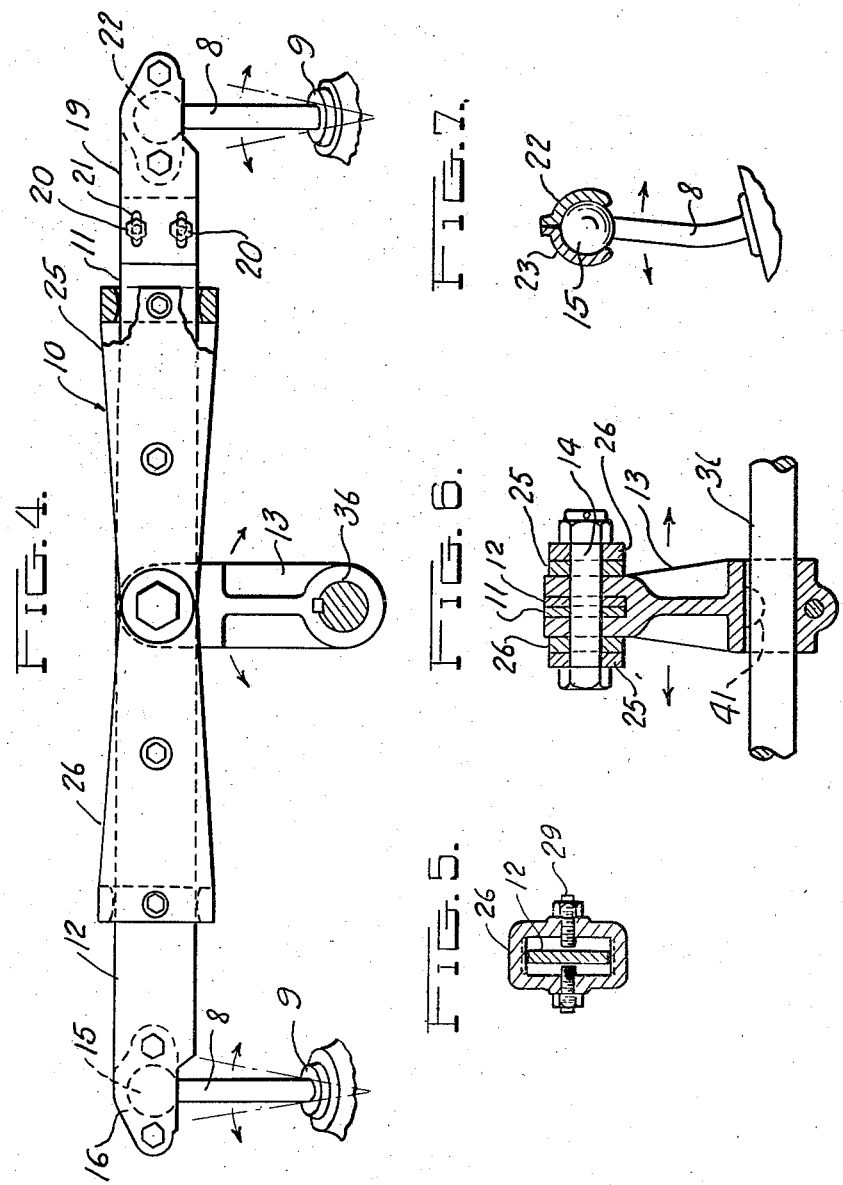
INVENTOR.
Thomas F. Rainsford
BY
Barnes, Kisselle, Laughlin & Raisch
Attorneys

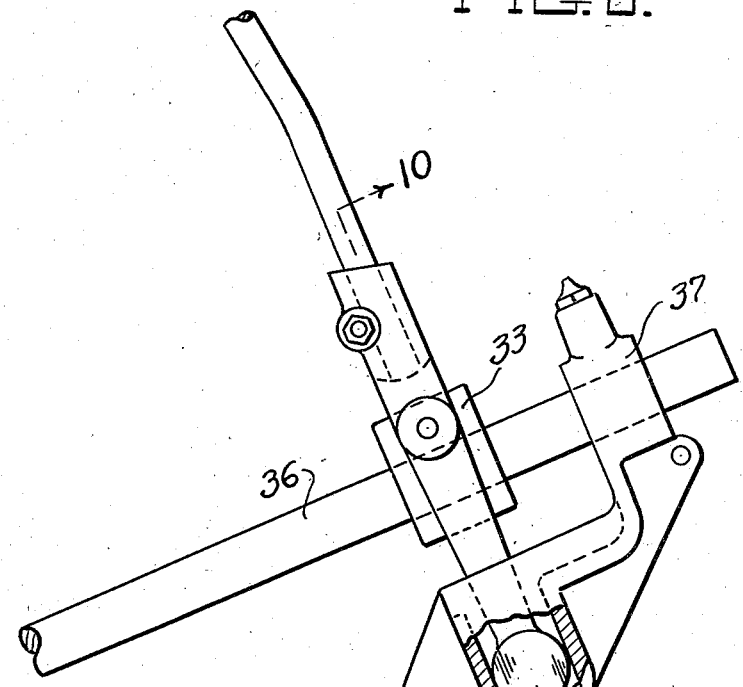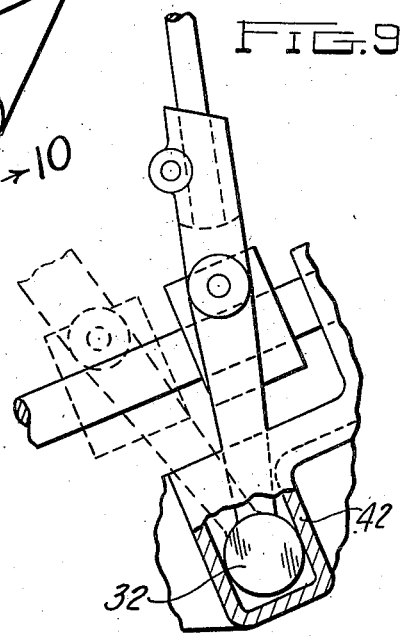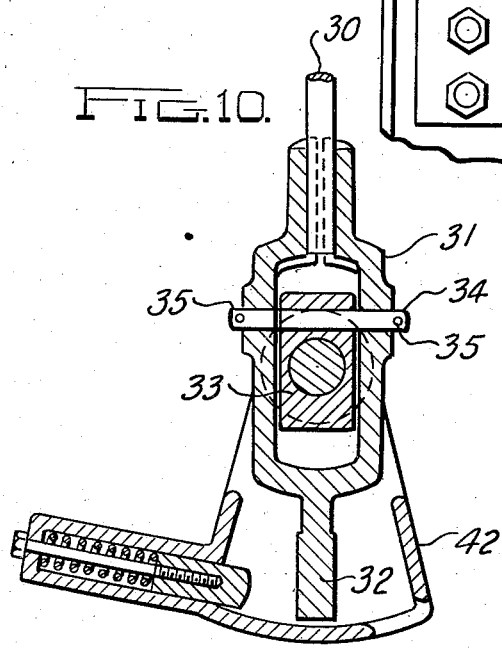

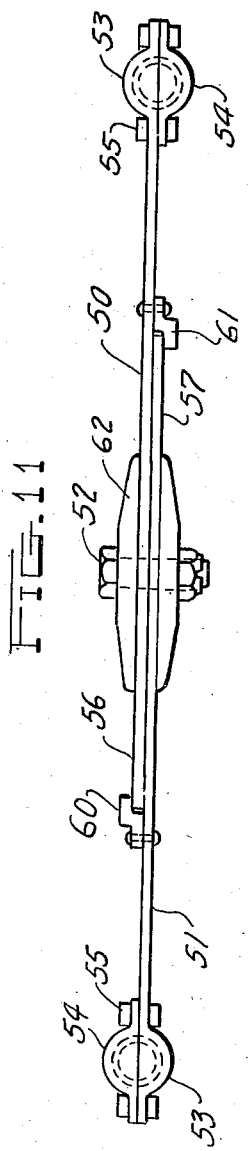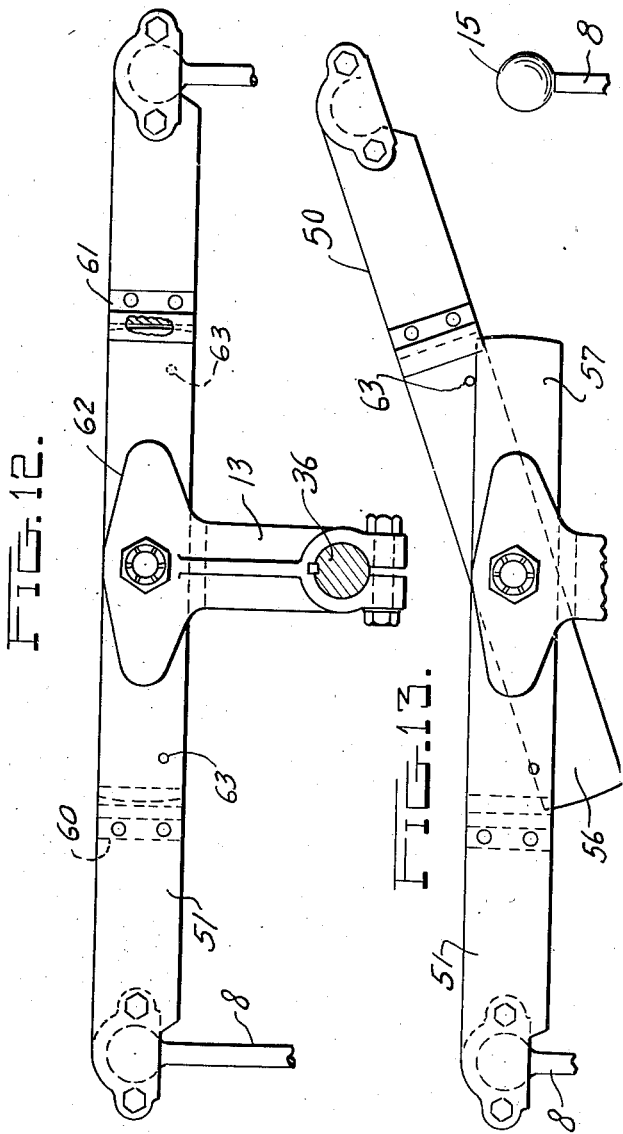

Patented Aug. 7, 1945

2,381,773

UNITED STATES PATENT OFFICE 2,381,773

GEAR SHIFTING MECHANISM

Thomas F. Rainsford, Detroit, Mich., assignor of one-half to Lloyd Lawson, Dearborn, and one-half to Anthony J. D'Anna, Wyandotte, Mich.

Application June 7, 1944, Serial No. 539,057

10 Claims. (Cl. 74—473)

This invention relates to a gear shifting mechanism for a dual drive motor vehicle.

It is old in the automotive vehicle art to drive trucks and tractors in tractor-trailer combinations with two internal combustion engines mounted side by side and connected by separate drive shafts and axles to the driving vehicle wheels. In a dual drive motor vehicle it is desirable to have the transmissions shifted simultaneously from one driving or gear speed into another from a single point.

It is common knowledge that each transmission has its own peculiar characteristics which manifests itself in the shifting of the transmission from one gear or speed to another, for example, some transmissions will shift easier than others.

It is an object of this invention to produce a gear shifting mechanism for a plurality of automotive transmissions which will shift all the transmissions from a single point and which will readily adjust itself to the varying shifting characteristics of different transmissions. The invention also contemplates a multiple transmission gear shifting arrangement which is rugged and simple in structure and efficient in operation.

Occasionally one of the engines of a dual motor vehicle will cut out or cease to fucntion. In such case it is desirable to shift the transmission of such dead engine into neutral and proceed along the road on the one live engine.

It is another object of this invention to produce a gear shift arrangement for a plurality of transmissions which can be readily disconnected from any engine which dies or ceases to operate.

In the drawings:

Fig. 1 is a sectional elevation through a dual-drive motor truck showing the gear shifting mechanism, this section being taken substantially along the line 1—1 of Fig. 2.

Fig. 2 is a plan view of a part of the mechanism taken substantially on the line 2—2 of Fig. 1.

Fig. 3 is a partial view similar to Fig. 2 with the gears in engaged position and engaging position.

Fig. 4 is a sectional elevation taken substantially on the line 4—4 of Fig. 2.

Fig. 5 is a section along the line 5—5 of Fig. 2.

Fig. 6 is a section along the line 6—6 of Fig. 2.

Fig. 7 is a section along the line 7—7 of Fig. 2.

Fig. 8 is an enlarged elevation of the forward part of the gear shift mechanism.

Fig. 9 is a view similar to Fig. 8 showing the main gear shift lever in a plurality of positions.

Fig. 10 is a section taken along the line 10—10 of Fig. 8.

Figs. 11, 12 and 13 are detail views showing a modified form of cross bar for my gear shifting mechanism.

Referring more particularly to the drawings the chassis frame of the vehicle is designated 1, the floor 2, the steering wheel 3, the two engines 4 and 5 which drive the vehicle and their transmissions 6 and 7 respectively. The transmissions are of the conventional sliding gear type which can be shifted into a plurality of different forward speeds or gears as well as into reverse. Each transmission is provided with a conventional gear shift lever 8 pivoted on the transmission housing by means of the usual ball and socket joint 9 for universal movement (Fig. 4).

The gear shift levers 8 are connected together by a cross piece generally designated 10. Cross piece 10 comprises two arms 11 and 12 of strip spring steel which are pivoted in the bifurcated end of crank arm 13 by means of pin 14. Arms 11 and 12 are connected to the front ends of gear shift levers 8 which are shaped in the form of balls 15. The outer end of arm 12 is shaped in the form of a semi-spherical socket 16. A semi-spherical cap 17 is secured to the end of arm 12 by bolts 18 and cooperates to form a spherical housing for ball 15 at the end of gear shift lever 8 for transmission 6. Right hand arm 11 is provided with an adjustable extension 19 which is secured to arm 11 by bolts 20 which pass through elongated slots 21 in arm 11. Extension 19 is provided with a semi-spherical socket 22. A semi-spherical cap 23 is secured to extension 19 by bolts 24 and cooperates with socket 22 to form a spherical socket for ball 15 on the gear shift lever for transmission 7. By loosening bolts 20 extension 19 can be slid lengthwise of arm 11 to adjust the overall length of cross piece 10 as required by the specific gear shift levers 8 upon which the cross piece is mounted. After the adjustment is made bolts 20 are screwed down tight.

To accommodate the different shifting characteristics of the transmissions to which the cross piece 10 may be applied provision is made for adjusting the tension or flexibility of spring arms 11 and 12. To this end yokes 25 and 26, each in the form of U brackets, are pivotally mounted on pin 14. Yoke 25 straddles arm 11 and yoke 26 straddles arm 12. Yokes 25 and 26 are each provided with two pairs of opposed adjustable screws 27 and 29 provided with lock nuts 28. Screws 27 and 29 have a screw fit in threaded openings in the yokes. Screws 29 are preferably positioned at the outer ends of yokes 25 and 26 and screws 27 intermediate the outer ends of yokes 25 and 26 and their axes of pivoting 14.

If the transmissions are such that they require a maximum of spring in the cross piece arms 11 and 12, then screws 27 and 29 are backed up free of arms 11 and 12 so that the arms spring fore and aft about their point of anchoring in the bifurcated end of arm 13. By springing arms 11 and 12 about their point of pivoting on bolt 14 one obtains a maximum of flexibility in these arms and accommodates a condition wherein the gears of the one transmission 6, for example, would mesh more easily and quickly than the gears of transmissions 7.

If it is desired to have the arms 11 and 12 somewhat stiffer, then screws 27 can be screwed in so that they contact arms 11 and 12 on opposite sides and then locked in place by lock nuts 28. Arms 11 and 12 are shown thus adjusted for tension in Figs. 2 and 3. Note that opposed screws 29 limit the amount that arms 11 and 12 can spring about the inner ends of screws 27 as a fulcrum or point of suspension. If a still stiffer spring action on the part of arms 11 and 12 is desired, then screws 29 are tightened down on arms 11 and 12. It should be noted that arms 11 and 12 act as cantilever springs which spring about their points of suspension 13 or 27 or 29 with a cantilever action. Yokes 25 and 26 serve as stiffeners which cooperate with screws 27 and 29 to give either a soft or stiff spring action on the part of arms 11 and 12 as required by the specific transmissions to which the cross piece 10 is applied.

The shifting of both transmissions 6 and 7 is effected from a central point by main gear shift lever 30 provided with an intermediate yoke portion 31 and a lower end portion 32 in the form of an integral circular disc. Lever 30 is pivoted on a block 33 by means of a pintle pin 34 which passes through bearing openings in yoke 31 and block 33 and is retained therein by cotter pins 35. Block 33 is fixed on rod 36 which is axially shiftable and rotatable in fixed bearing support members 37 and 38 (Fig. 1). Stationary bearing 38 is supported on the transmission housings by brackets 39 and front stationary bearing 37 for rod 36 is fixed in place by bracket 40 mounted on the chassis frame 1. Crank arm 13 is keyed on shift rod 36 by key 41 so that crank arm 13 is fixed with respect to rod 36 and will move with arm 36 as if it were an integral part thereof. The lower end 32 of lever 30 is supported in a socket 42 formed in bracket 40. Socket 42 is dimensioned so that pivot end 32 of lever 30 can shift laterally of the vehicle, that is, from right to left and return, as viewed in Fig. 10, but cannot shift forwardly or rearwardly of the vehicle as viewed in Figs. 1, 8 and 9. Thus, lever 30 fulcrums forwardly and backwardly of the vehicle, as viewed in Fig. 1, about disc end 32 and socket 42 as a fulcrum thereby causing forward or rearward longitudinal axial movement of rod 36. However, when lever 30 is pivoted laterally of the vehicle, that is, to the right or to the left, as viewed in Fig. 1, then lever 30 fulcrums about rod 36 as a center and rod 36 rotates in fixed bearings 37 and 38. Thus, it will be seen that shifting movement of rod 30 causes rod 36 to rotate in bearings 37 and 38 or to move lengthwise in these bearings or both of these movements to occur simultaneously or consecutively.

*Operation.*—From the above description it will be seen that if main gear shift lever 30 is shifted to the right of the vehicle an identical movement will be transmitted to levers 8 through rod 36, arm 13 and cross piece 10. Preferably the axes or centers about which levers 8 and arm 13 pivot are in alignment. Thus, if arm 13 is pivoted to either right or left of center (Fig. 4), balls 15 and pin 14, that is the point of pivoting between piece 10 and levers 8 and arm 13 will remain in alignment so that arms 11 and 12 and yokes 25 and 26 will not need to fulcrum up and down about fulcrum 14. However, if rod 36 upon which arm 13 pivots should not be in alignment with the lower points about which levers 8 pivot, then arms 11 and 12 and yokes 25 and 26 will fulcrum about pin 14 as arm 11 is swung to the right or left of center.

Rod 36 cannot raise and lower. Therefore if lever 36 is moved rearwardly or to the left, Fig. 1, causing a rearward axial movement of rod 36, a similar rearward movement will be transmitted by arm 13 and cross piece 10 to levers 8. However, in shifting to the rear balls 15 of levers 8 will travel along an arcuate path whereas pin 14 about which arms 11 pivot will travel in a straight line path and neither raise nor lower. Therefore, during such movement arms 11 and 12 and yokes 25 and 26 will pivot about pin 14 as a center.

Thus, it is evident from the above that regardless of the direction in which lever 30 is pivoted to shift the transmissions a similar and identical movement will be transmitted through shaft 36 and cross piece 10 to levers 8. The movements of levers 30 and 8 will in most cases be simultaneous whereas in some instances the movement will be substantially simultaneous as, for example, as illustrated in Fig. 3 there is a momentary lag in the meshing of the gears of transmission 7 which is accommodated by the spring action of arm 11.

If engine 5, for example, should die, then it is desirable to disconnect the gear shifting arrangement for transmission 7 so that transmission 7 can be left in neutral and the vehicle in such case will continue enroute driven by engine 4. In such case socket plate 23 is disconnected from socket 22 and extension 19 disconnected from arm 11. Thereafter transmission 6 can be shifted through lever 30 without in anywise affecting transmission 7 which will be left in neutral.

If engine 4 should die, then half socket 17 is removed from arm 12 and arm 12 is pivoted upwardly and then downwardly about pin 14 in a clockwise direction (Fig. 4) so that arm 12 and yoke 26 now rest upon yoke 25. Thereafter shifting of transmission 7 can be effected through lever 30 without shifting transmission 6 from neutral.

In Figs. 11, 12 and 13 there is shown a modified form of cross piece which comprises two arms 50 and 51 which are pivoted on arm 13 by bolt 52. Arms 50 and 51 are each provided with semi-spherical sockets 53 and semi-spherical socket plates 54 secured to the arms by bolts 55. Members 53 and 54 cooperate to form a detachable socket for balls 15 at the tops of levers 8 as in the principal form of the invention.

Arm 50 extends beyond pin 52 as at 56 to serve as a stiffener from arm 51. Arm 51 extends beyond pin 52 as at 57 to serve as a stiffener for arm 50. Arms 50 and 51 are made of spring steel. Arm 51 has riveted thereto a bracket 60 which has a lip overlying the outer end of extension 56. Arm 50 has riveted thereto a bracket 61 which has a lip overlying the outer end of extension 57. Thus spring arms 50 and 51 have a cantilever action about their support which is the upper bifurcated end 62 of arm 13. Arms 50 are also free to pivot upwardly and downwardly about pin 52 as is occasioned in the shifting of levers 8.

In this modified form of cross piece if one of the engines should die, then either arm 50 or 51 can be disconnected from lever 8 and raised upwardly to the position indicated in Fig. 13. Each arm is provided with a hole 63. When arm 50 is raised upwardly to the position shown in Fig. 13, a pin is passed through opening 63 which retains arm 50 in elevated position so that the vehicle can proceed under way with one engine and the transmission for this engine shifted without shifting the transmission for the dead engine out of neutral.

I claim:

1. Gear shifting mechanism for a variable speed transmission comprising a main lever positioned at a point remote from said transmission, a gear shift lever for said transmission, an element both shiftable along and rotatable about its longitudinal axis, means connecting said element to said main lever whereby said element can be rotated about and shifted along its longitudinal axis by manipulation of said main lever, an arm fixed on said element, a resilient cross piece, a pivotal connection between said cross piece and said arm, and a universal pivotal connection between said gear shift lever and said cross piece whereby movement of said main lever causes a corresponding movement of the gear shift lever.

2. Gear shifting mechanism for a variable speed transmission comprising a main lever positioned at a point remote from said transmission, a gear shift lever for said transmission, an element both shiftable along and rotatable about its longitudinal axis, means connecting said element to said main lever whereby said element can be rotated about and shifted along its longitudinal axis by manipulation of said main lever, an arm fixed on said element, a cross piece in the form of a flat spring metal strip, a pivotal connection between said cross piece and said arm, and a universal pivotal connection between said gear shift lever and said cross piece whereby movement of said main lever causes a corresponding movement of the gear shift lever.

3. Gear shifting mechanism for a variable speed transmission comprising a main lever positioned at a point remote from said transmission, a gear shift lever for said transmission and extending upwardly therefrom, an element both shiftable along and rotatable about its longitudinal axis, means connecting said element to said main lever whereby said element can be rotated about and shifted along its longitudinal axis by manipulation of said main lever, an arm fixed on said element and extending upwardly from said element, a resilient cross piece, a pivotal connection between said cross piece and said arm, said pivotal connection restraining said cross piece for pivoting in a plane substantially perpendicular to the longitudinal axis of said element, and a universal pivotal connection between said gear shift lever and said cross piece whereby movement of said main lever causes a corresponding movement of the gear shift lever.

4. Gear shifting mechanism for an automotive vehicle having a plurality of engines and a variable speed transmission for each engine comprising a main lever positioned remote from said transmissions, a separate gear shift lever for each transmission and extending therefrom, a relatively rigid, torsional and draft element both shiftable along and rotatable about its longitudinal axis, means connecting said element to said main lever whereby said element can be rotated about and shifted along its longitudinal axis by manipulation of said main lever, a crank arm fixed on said element remote from said main lever, a pair of resilient cross members, a swivel connection between the ends of the cross members and said crank arm which swivel connection is constructed and arranged so that said cross members swivel in a plane substantially perpendicular to the longitudinal axis of said draft element, and a universal pivotal connection between said separate gear shift levers and the other ends of said cross members whereby movement of said main lever causes a corresponding movement of the separate gear shift levers.

5. Gear shifting mechanism for an automotive vehicle having a plurality of engines and a variable speed transmission for each engine comprising a main lever positioned remote from said transmissions, a separate gear shift lever for each transmission and extending therefrom, a relatively rigid, torsional and draft element both shiftable along and rotatable about its longitudinal axis, means connecting said element to said main lever whereby said element can be rotated about and shifted along its longitudinal axis by manipulation of said main lever, a crank arm fixed on said element remote from said main lever, a resilient cross arm between the said crank arm and each of said gear shift levers, a swivel connection between said cross arms and said crank arm restraining said cross arms to pivotal movement in a plane substantially perpendicular to the longitudinal axis of said shiftable element, a universal pivotal connection between said gear shift levers and the cross arms whereby movement of said main lever causes a corresponding movement of the gear shift levers.

6. Gear shifting mechanism for an automotive vehicle having a plurality of engines and a variable speed transmission for each engine comprising a main lever positioned remote from said transmissions, a separate gear shift lever for each transmission and extending therefrom, a relatively rigid, torsional and draft element both shiftable along and rotatable about its longitudinal axis, means connecting said element to said main lever whereby said element can be rotated about and shifted along its longitudinal axis by manipulation of said main lever, a cross arm in the form of a spring metal strip between the said crank arm and each of said gear shift levers, a swivel connection between said cross arms and said crank arm restraining said cross arms to pivotal movement in a plane transversely of the longitudinal axis of said shiftable element, a universal pivotal connection between said gear shift levers and the cross arms whereby movement of said main lever causes a corresponding movement of the gear shift levers.

7. The combination as set forth in claim 6 including means for adjusting the spring action of said cross arms.

8. The combination as set forth in claim 6 including stops for limiting the cantilever spring action of said cross arms, each stop being positioned between the said swivel connection and a gear shift lever.

9. Gear shifting mechanism for an automotive vehicle having a plurality of engines and a variable speed transmission for each engine comprising a main lever positioned remote from said transmissions, a separate gear shift lever for each transmission and extending therefrom, a relatively rigid, torsional and draft element shiftable along and rotatable about its longitudinal axis, a fulcrum for the lower end of said main lever extending laterally of said torsion and draft element and restraining the lower end of said lever against movement longitudinally of said element, means connecting said element to said main lever whereby said element can be rotated about and shifted along its longitudinal axis by manipulation of said main lever, a cross arm in the form of a spring metal strip between the said crank arm and each of said gear shift levers, a swivel connection between said cross arms and said crank arm restraining said cross arms substantially to pivotal movement in a plane transversely of said shiftable element, a universal pivotal connection between said gear shift levers and the cross arms whereby movement of said main lever causes a corresponding movement of the gear shift levers.

10. The combination as set forth in claim 5 including a rigid yoke member mounted on said said arm and positioned over one of said resilient cross arms, and adjustable stop members carried by said yoke constructed and arranged to clamp the resilient cross arm therebetween at a point spaced outwardly from its axis of swiveling whereby the spring action of said cross arm is stiffened.

THOMAS F. RAINSFORD.